J. H. MAYDOLE.
Curd Agitator.

No. 40,764. Patented Dec. 1, 1863.

Witnesses.

Inventor:
James H. Maydole

UNITED STATES PATENT OFFICE.

JAMES H. MAYDOLE, OF EATON, NEW YORK.

IMPROVEMENT IN CURD-AGITATORS.

Specification forming part of Letters Patent No. 40,764, dated December 1, 1863.

*To all whom it may concern:*

Be it known that I, JAMES H. MAYDOLE, of Eaton, in the county of Madison, State of New York, have invented a new and useful implement or machine to be used in the manufacture of cheese, which I call a "Curd Agitator and Separator"; and I do hereby declare that the following is a full and exact description thereof, reference being had to the accompanying drawings, and to the letters of reference marked thereon, in which—

Figure 1:
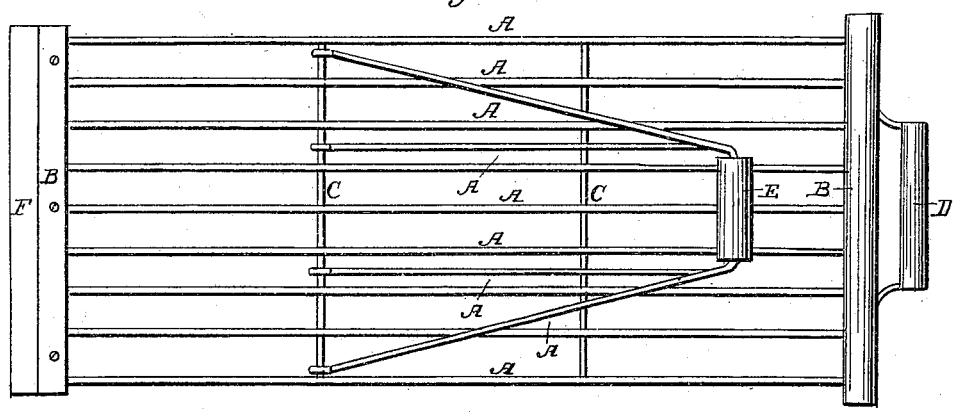
Figure 2:
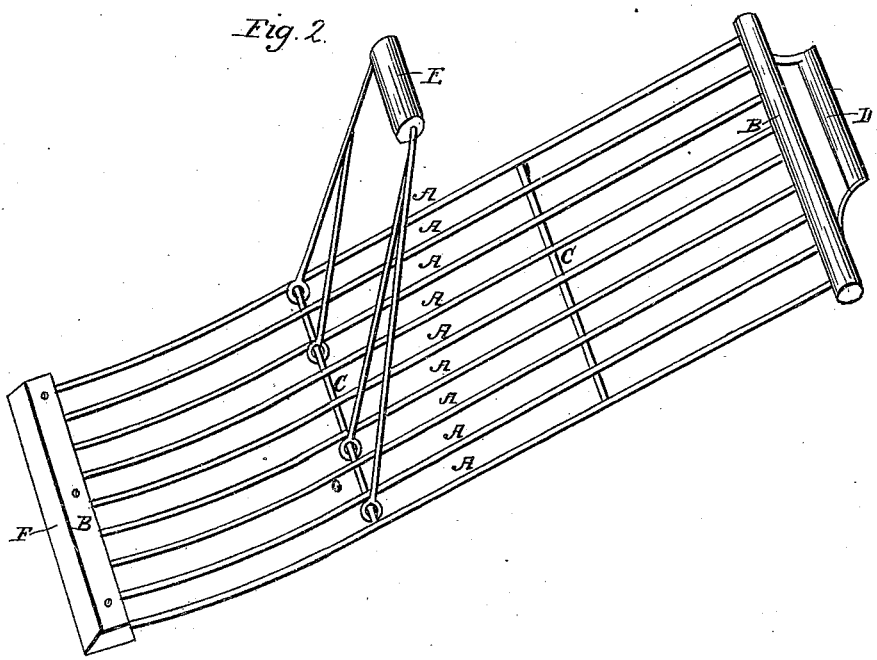

Figure 1 is a top view, and Fig. 2 is a perspective view.

In order that my invention and improvement may be clearly understood, it will be necessary for me to describe the process of cheese-making, or that part of it during which the implement is used.

The milk is set in a vat or tub and a sufficient amount of rennet added to coagulate it. This coagulated mass is cut into small particles by means of a sharp implement, and soon thereafter the whey or watery substance separates from the curd, and a portion is removed. In cutting the coagulated mass, above referred to, there will be a portion of it near the bottom of the vat that cannot be reached by the knife without injury to the vat. This portion must be carefully brought to or near the surface. It is then in position to be acted upon by the knife.

Prior to my invention the lifting of the uncut portion was done by the hand.

My implement or machine performs another important office that has heretofore been performed mainly by the hand—viz., the rapid stirring of the curd during the process of scalding. This takes from two to three hours. The tendency of the curd during this process is to settle and adhere to the bottom of the vat.

To enable others skilled in the art to make and use my invention, I will proceed to describe its construction and operation.

I construct my curd agitator and separator in part of number six or number eight wire, (marked A in the drawings.) From twelve to twenty pieces, thirty inches long, may be used, more or less. I place said wires from three-fourths to one-inch apart and secure them firmly by means of the ends B B and the bars C C.

D represents a handle attached to the rear cross-piece. There is also another handle, (shown at E.) This handle is located a little in advance of the center of the machine, and used for lifting the forward part. To the forward cross-piece I attach a shoe or scraper, (marked F.) This shoe or scraper should have a sharp, smooth edge. It (the shoe) may be made of wood or rubber, or any known substance that will not injure the vat. That portion of the wires connected to the forward cross-piece should curve up, as shown in the drawings.

In using the implement the operator holds it in an upright position and passes it between the side of the vat and its contents to the bottom. It is then moved along the bottom a short distance, when it should be moved upward and backward. This operation should be continued during the process of scalding.

Having thus fully described the nature and object of my invention, what I claim as my invention, and desire to secure by Letters Patent, is—

1. A curd agitator consisting of a series of rods, arranged relatively as described, in combination with a shoe or scraper provided with a thin edge, so as to pass under the curd and close to the bottom of the vat, for the purposes set forth.

2. In combination with my improved curd-agitator, a handle so located upon the machine as that the forward end of said machine may be conveniently elevated or depressed during the operation thereof, substantially as and for the purposes set forth.

3. The employment of two handles, arranged relatively as described, so as to enable the operator to lift the forward part of the machine by one and move it forward and backward by the other, as specified.

JAMES H. MAYDOLE.

Witnesses:
A. W. MORSE,
L. E. MORSE.